United States Patent
Choi et al.

(10) Patent No.: US 12,445,738 B2
(45) Date of Patent: Oct. 14, 2025

(54) IMAGE PROCESSING DEVICE AND IMAGE PROCESSING METHOD

(71) Applicant: SK hynix Inc., Icheon-si (KR)

(72) Inventors: Jun Hyeok Choi, Icheon-si (KR); Dae Hyun Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 249 days.

(21) Appl. No.: 18/298,242

(22) Filed: Apr. 10, 2023

(65) Prior Publication Data
US 2024/0171866 A1    May 23, 2024

(30) Foreign Application Priority Data
Nov. 18, 2022    (KR) .......................... 10-2022-0155574

(51) Int. Cl.
| | |
|---|---|
| H04N 23/84 | (2023.01) |
| H04N 23/81 | (2023.01) |
| H04N 25/10 | (2023.01) |
| H04N 25/62 | (2023.01) |

(52) U.S. Cl.
CPC ............ *H04N 23/84* (2023.01); *H04N 23/81* (2023.01); *H04N 23/843* (2023.01); *H04N 25/10* (2023.01); *H04N 25/62* (2023.01)

(58) Field of Classification Search
None
See application file for complete search history.

(56) References Cited

U.S. PATENT DOCUMENTS

| | | | |
|---|---|---|---|
| 9,307,214 B1* | 4/2016 | Liu ..................... | G06V 10/56 |
| 10,015,424 B2 | 7/2018 | Kasai | |
| 2008/0259186 A1* | 10/2008 | Wang .................. | H04N 25/611 |
| | | | 348/238 |
| 2012/0274799 A1* | 11/2012 | Wang .................... | H04N 23/88 |
| | | | 348/222.1 |
| 2015/0124128 A1* | 5/2015 | Chen .................... | H04N 25/61 |
| | | | 348/251 |
| 2015/0326838 A1* | 11/2015 | Kawai ................. | H04N 23/843 |
| | | | 348/280 |
| 2021/0227185 A1* | 7/2021 | Lee ....................... | H04N 25/57 |

FOREIGN PATENT DOCUMENTS

KR    1020210004229 A    1/2021

* cited by examiner

*Primary Examiner* — Twyler L Haskins
*Assistant Examiner* — Wesley J Chiu
(74) *Attorney, Agent, or Firm* — WILLIAM PARK AND ASSOCIATES LTD.

(57) ABSTRACT

An image processing device includes a memory for storing reference color ratios and crosstalk values of each of light source images acquired by sensing light sources having different wavelengths. The image processing device also includes a processor for receiving an image including a plurality of regions each including outer pixel values and inner pixel values of the same color, and correcting the outer pixel values or the inner pixel values by using difference values between the respective reference color ratios and a color ratio of the image as weights of the crosstalk values.

17 Claims, 16 Drawing Sheets

| LIMG (index) | wavelength (nm) | CR (color ratio) | |
|---|---|---|---|
| | | GR ratio | GB ratio |
| L1 | 426 | 3.67 | 0.16 |
| L2 | 467 | 10.58 | 0.38 |
| ... | ... | ... | ... |
| Ln-1 | 622 | 0.32 | 4.83 |
| Ln | 658 | 0.19 | 1.88 |

FIG. 6A

| LMG (index) | wavelength (nm) | X-talk map (index) | position | XV (X-talk value) | |
|---|---|---|---|---|---|
| | | | | GR X-talk value | GB X-talk value |
| L1 | 426 | X1 | (1, 1) | ⋮ | ⋮ |
| | | | ⋮ | ⋮ | ⋮ |
| | | | (u, v) | ⋮ | ⋮ |
| L2 | 467 | X2 | (1, 1) | ⋮ | ⋮ |
| | | | ⋮ | ⋮ | ⋮ |
| | | | (u, v) | ⋮ | ⋮ |
| ⋮ | ⋮ | ⋮ | (1, 1) | ⋮ | ⋮ |
| Ln−1 | 622 | Xn−1 | ⋮ | ⋮ | ⋮ |
| | | | (i, j) | 1.08 | ⋮ |
| | | | ⋮ | ⋮ | ⋮ |
| | | | (u, v) | ⋮ | ⋮ |
| Ln | 658 | Xn | (1, 1) | ⋮ | ⋮ |
| | | | ⋮ | ⋮ | ⋮ |
| | | | (i, j) | 1.164 | ⋮ |
| | | | ⋮ | ⋮ | ⋮ |
| | | | (u, v) | ⋮ | ⋮ |

600

$$XV = \frac{\text{average\_outerpixel}}{\text{average\_innerpixel}}$$

$$GR\ ratio = \frac{(251+258+243+261+230+241+250+246)/8}{(233+235+223+234+224+237+241+228)/8}$$

$$= 1.067$$

$$XV = \{X2, X3, X6, X7, X10, X11, X14, X15\}$$

$$X2 = \frac{G1}{G2},\ X3 = \frac{G4}{G3},\ X6 = \frac{G5}{G6},\ X7 = \frac{G8}{G7}$$

$$X10 = \frac{G9}{G10},\ X11 = \frac{G12}{G11},\ X14 = \frac{G13}{G14},\ X15 = \frac{G16}{G15}$$

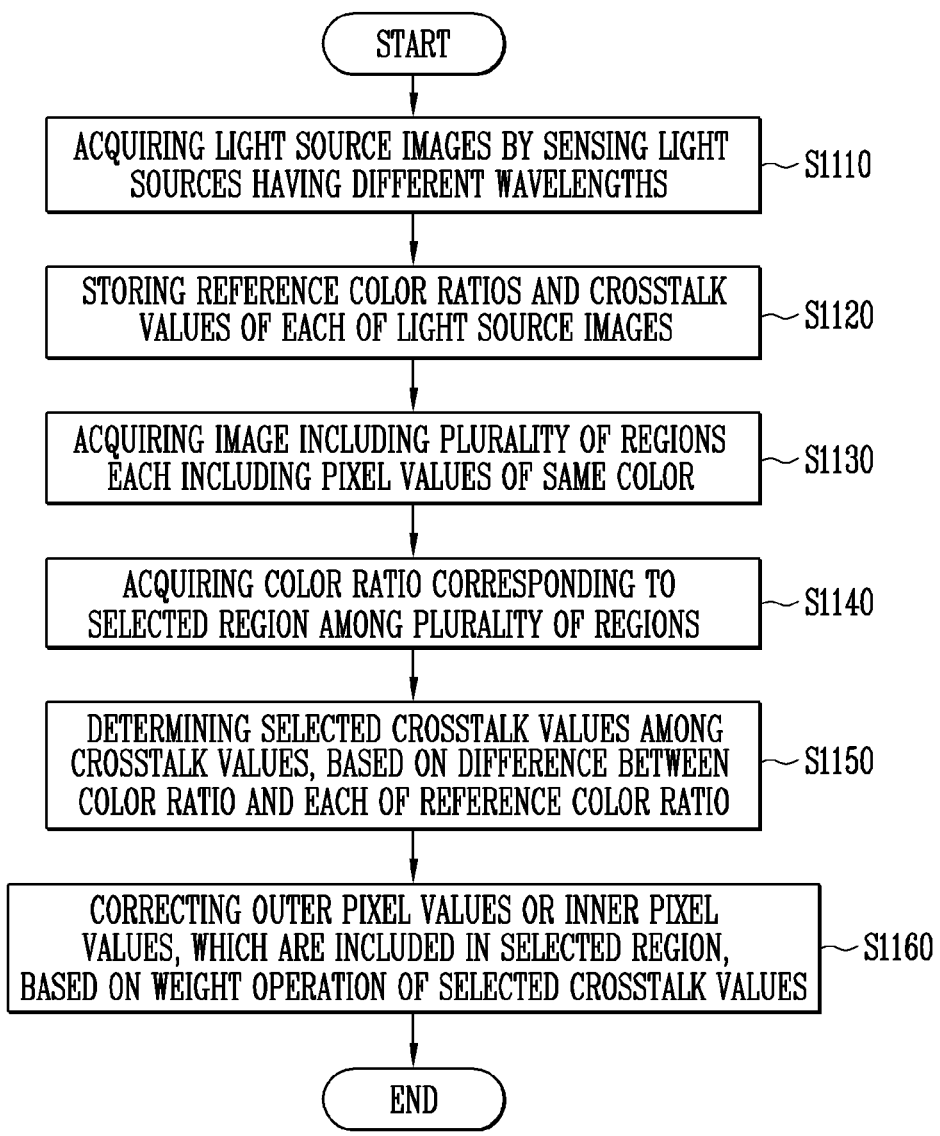

IMAGE PROCESSING DEVICE AND IMAGE PROCESSING METHOD

CROSS-REFERENCE TO RELATED APPLICATION

The present application claims priority under 35 U.S.C. § 119(a) to Korean patent application number 10-2022-0155574 filed on Nov. 18, 2022, in the Korean Intellectual Property Office, the entire disclosure of which is incorporated by reference herein.

BACKGROUND

1. Technical Field

The present disclosure generally relates to an image processing device and an image processing method, and more particularly, to an image processing device and an image processing method, which correct pixel values.

2. Related Art

A remosaic algorithm is an algorithm for compensating for a red pixel and a blue pixel by using a green pixel. When an imbalance of the green pixel is large in the remosaic algorithm, image quality may be damaged. In particular, when an image sensor having a quad square arrangement receives light having an ultra-short wavelength (violet) or an ultra-long wavelength (red), the green pixel may acquire a very low pixel value, and the blue pixel or the red pixel may acquire a very high pixel value. An imbalance may occur in the green pixel due to crosstalk (x-talk) of the red pixel or the blue pixel. There exists a problem in that a quadrangular grid phenomenon occurs in an image on which the remosaic algorithm is performed, and therefore, an image processing technique for solving the problem is required.

SUMMARY

Embodiments provide an image processing device and an image processing method, which can reduce crosstalk of an image.

In accordance with an embodiment of the present disclosure, an image processing device includes: a memory configured to store reference color ratios and crosstalk values of each of light source images acquired by sensing light sources having different wavelengths; and a processor configured to receive an image including a plurality of regions each including outer pixel values and inner pixel values of the same color, and correct the outer pixel values or the inner pixel values by using differences between the respective reference color ratios and a color ratio of the image as weights of the crosstalk values.

In accordance with another aspect of the present disclosure, an image processing method includes: acquiring light source images by sensing light sources having different wavelengths; storing reference color ratios and crosstalk values of each of the light source images; acquiring an image including a plurality of regions each including pixel values of the same color; acquiring a color ratio corresponding to a selected region among the plurality of regions; determining reference crosstalk values among the crosstalk values, based on a difference between the color ratio and each of the reference color ratios; and correcting outer pixel values or inner pixel values, which are included in the selected region, through a weight operation of the reference crosstalk values.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be enabling to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 6A is a diagram illustrating crosstalk map information in accordance with an embodiment of the present disclosure.

FIG. 11 is a diagram illustrating an image processing method in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
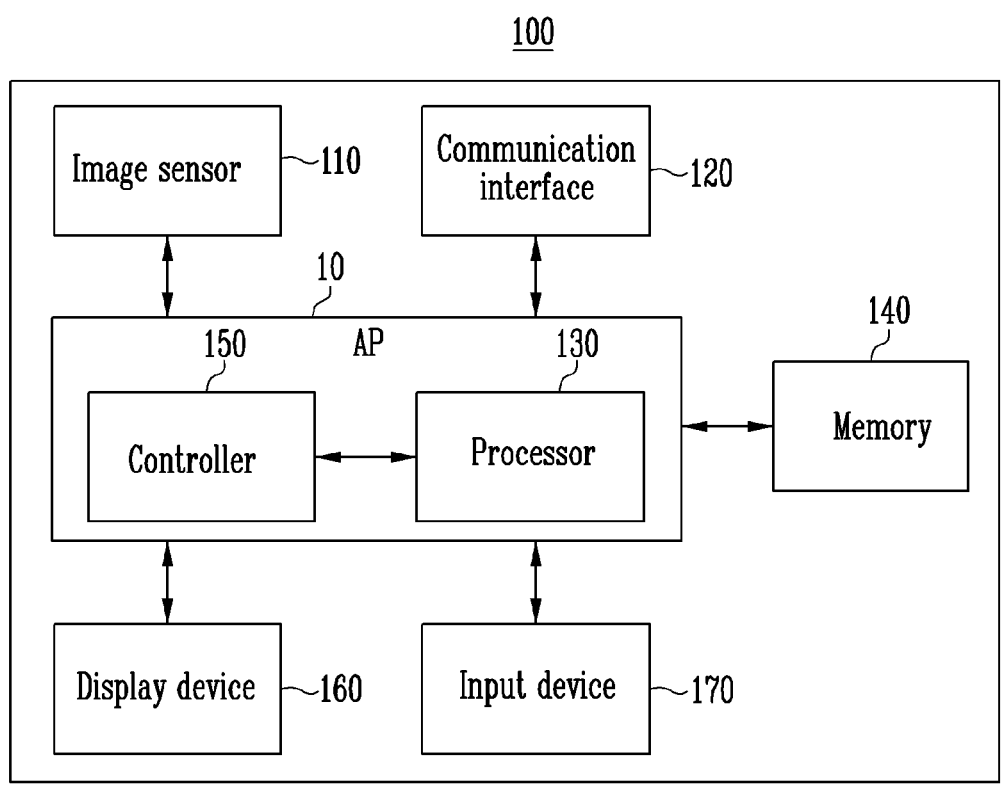
FIG. 1 is a diagram illustrating an image processing device in accordance with an embodiment of the present disclosure.

FIG. 1 is a diagram illustrating an image processing device in accordance with an embodiment of the present disclosure.

Referring to FIG. 1, the image processing device 100 may correct outer pixel values or inner pixel values among pixel values of the same color, which are included in a unit region within an image. Crosstalk or grid noise of the image can be reduced.

The image processing device 100 may be at least one of various electronic systems configured to acquire an image or picture of an external object, such as smartphones, tablets, black boxes, and automotive electrical systems. Alternatively, the image processing device 100 may be an electronic component included in the above-described electronic systems.

In an embodiment, the image processing device 100 may include an Application process (AP) 10, an image sensor 110, a communication interface 120, a memory 140, a display device 160, and an input device 170.

The AP 10 may include at least one of a processor 130 and a controller 150. The processor 130 may be implemented as one of an Image Signal Processor (ISP), a Digital Signal Processor (DSP), a Central Processing Unit (CPU), and a Graphics Processing Unit (GPU). The controller 150 may control an operation of a component included in the image processing device 100.

The image sensor 110 may acquire an image by sensing an optical signal. For example, the image sensor 110 may be implemented as a Charge Coupled Device (CCD) sensor, a Complementary Metal Oxide Semiconductor (CMOS) sensor, or the like. The image sensor 110 may include a plurality of pixels.

The communication interface 120 may transmit/receive information or signals according to various communication schemes. To this end, the communication interface 120 may include a circuit for performing wired communication or wireless communication.

The memory 140 may represent a device for storing data. The data may include at least one of an image, color ratio information, a crosstalk map, and instruction. The color ratio information may include information on a reference color ratio of light source images acquire by sensing light sources having different wavelengths. The crosstalk map may include crosstalk values. In embodiments, the memory 140 may represent at least one of a volatile memory device and a nonvolatile memory device.

The display device 160 is a device for visually outputting an image. The input device 170 is a device capable of inputting a command of a user through an interaction. For example, the input device 170 may be implemented as a keyboard, a keypad, a mouse, a microphone, a button or the like.

The processor 130 may acquire an image through the image sensor 110 or the communication interface 120. For example, the processor 130 may receive an image from an external device through the communication interface 120, or receive an image acquired by the image sensor 110 from the image sensor 110. The processor 130 may correct an outer pixel value or an inner pixel value by using a difference between a reference color ratio and a color ratio as a weight of a crosstalk value. The outer pixel value is a pixel value of the same color as the inner pixel value, and may be a pixel value located at the outside of the inner pixel value. This will be described in detail later.

Figure 2:
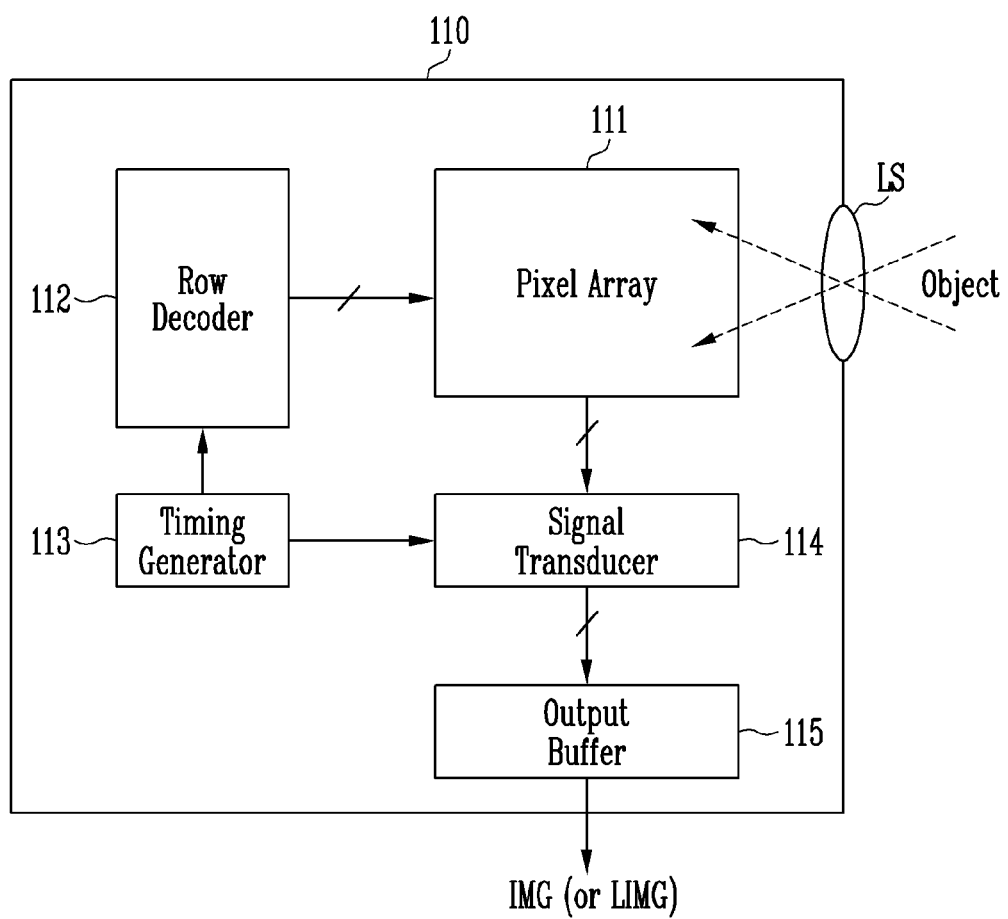
FIG. 2 is a diagram illustrating an image sensor in accordance with an embodiment of the present disclosure.

FIG. 2 is a diagram illustrating an image sensor in accordance with an embodiment of the present disclosure.

Referring to FIG. 2, the image sensor 110 may include an optical lens LS, a pixel array 111, a row decoder 112, a timing generator 113, a signal transducer 114, and an output buffer 115.

The optical lens LS may refract an optical signal. The optical signal refracted through the optical lens LS may be transferred to the pixel array 111.

The pixel array 111 may include a plurality of pixels. The pixel is a unit for acquiring a pixel value. The pixel may include a color filter and a sensing circuit. The color filter may be disposed above the sensing circuit. An optical signal refracted through the optical lens LS may reach the sensing circuit while passing through the color filter. The color filter may allow an optical signal having a specific color (or wavelength) to pass therethrough, and block an optical signal having another color (or wavelength). For example, the pixel may be divided into a red pixel, a green pixel, and a blue pixel according to a color (e.g., red, green or blue) of which optical signal the color filter allows to pass therethrough. The sensing circuit may be disposed under the color filter. The sensing circuit may sense an electrical pixel signal from an optical signal by using a photoelectric effect.

The plurality of pixels may be arranged in row and column directions. The plurality of pixels may be arranged according to an extended Bayer pattern. For example, in a unit region of 22, a green pixel group may be disposed in a unit region located in a diagonal direction, and a red pixel group and a blue pixel group may be disposed in a unit region located in another diagonal direction. One pixel group may include pixels of the same color, and the pixels in the one pixel group may be arranged in m×n. Here, m and n are natural numbers independent from each other. For example, in the case of a quad square pattern, each pixel group may include pixels arrange in 4×4. However, this is merely illustrative, and n and m may be changed to various numbers.

The row decoder 112 may select pixels for reading pixel values under the control of the timing generator 113. For example, the row decoder 112 may select pixels located on a row corresponding to an address among the plurality of pixels included in the pixel array 111 in response to the address and control signals, which are output from the timing generator 113.

The timing generator 113 may control the row decoder 112 and a signal transducer 114 to read pixel values from pixels located on a specific row in the pixel array 111. For example, the timing generator 113 may sequentially output, to the row decoder 112, a row address representing pixels located on a specific row of the pixel array 111. The timing generator 113 may output, to the row decoder 112, a command for adjusting an exposure time of a pixel located on a specific column.

The signal transducer 114 may acquire pixel values by using pixel signals received from the pixel array 111 and a row address received from the timing generator 113. For example, the pixel signal may be a voltage. The signal transducer 114 may include an analog-digital converter. Also, the signal transducer 114 may transfer the pixel values to the output buffer 115.

The output buffer 115 may be connected to the signal transducer 114 through a plurality of column lines. The output buffer 115 may sequentially store pixel values of a row unit, which are received from the signal transducer 114. When pixel values of all rows are stored, the output buffer 115 may output one image IMG or one light source image LIMG, which includes the stored pixel values. The light source image LIMG may be an image acquired when a light source having a specific wavelength is incident onto the image sensor 110.

Figure 3A:
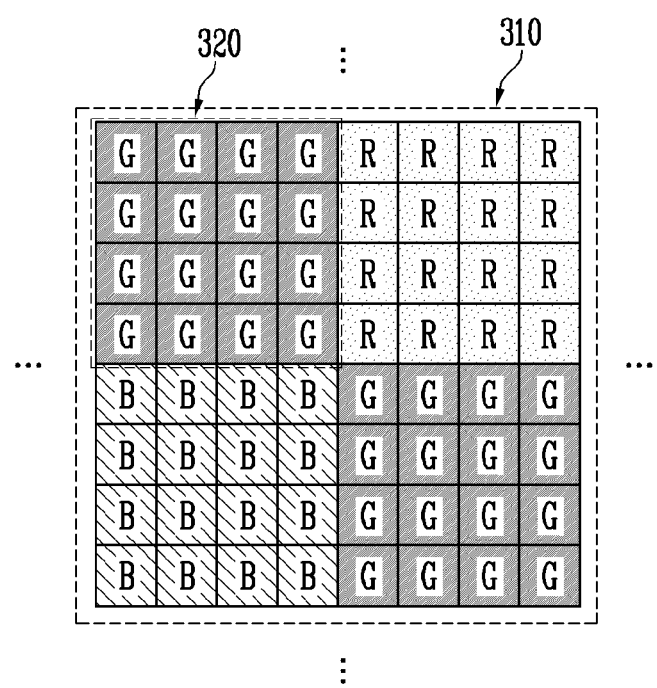
FIG. 3A is a diagram illustrating a pixel arrangement in accordance with an embodiment of the present disclosure.

FIG. 3A is a diagram illustrating a pixel arrangement in accordance with an embodiment of the present disclosure.

Referring to FIGS. 2 and 3A, the pixel array 111 may include a plurality of pixels arranged according to a quad square pattern 310.

According to the quad square pattern 310, pixels of the same color may be arrange in 4×4 in each unit region 320. For example, green pixels G may be arranged in 4×4 in each of a first unit region and a fourth unit region. Red pixels R may be arranged in 4×4 in a second unit region. Blue pixels B may be arranged in 4×4 in a third unit region. The first unit region and the fourth unit region may be located in a diagonal direction, and the second unit region and the third unit region may be located in another diagonal direction.

Meanwhile, the plurality of pixels included in the image sensor 110 may be arranged according to a triple square pattern, or the like. For example, in the case of the triple square pattern, pixels of the same color may be arranged in 3×3 in each unit region. In addition, the arrangement of the plurality of pixels may be variously modified and embodied, such as a case where pixels of the same color are arranged in n×m in each unit region. Here, n and m are natural numbers greater than 3.

A pixel arrangement of the image sensor may be identical to an arrangement of pixel values of an image acquired by the image sensor 110.

For example, when the pixels included in the image sensor 110 are arranged according to the quad square pattern 310, pixel values included in an image acquired by the image sensor 110 may be arranged according to the quad square pattern 310. Hereinafter, for convenience of description, a case where an arrangement of pixels or pixel values is the quad square pattern 310 will be assumed and described.

Figure 3B:
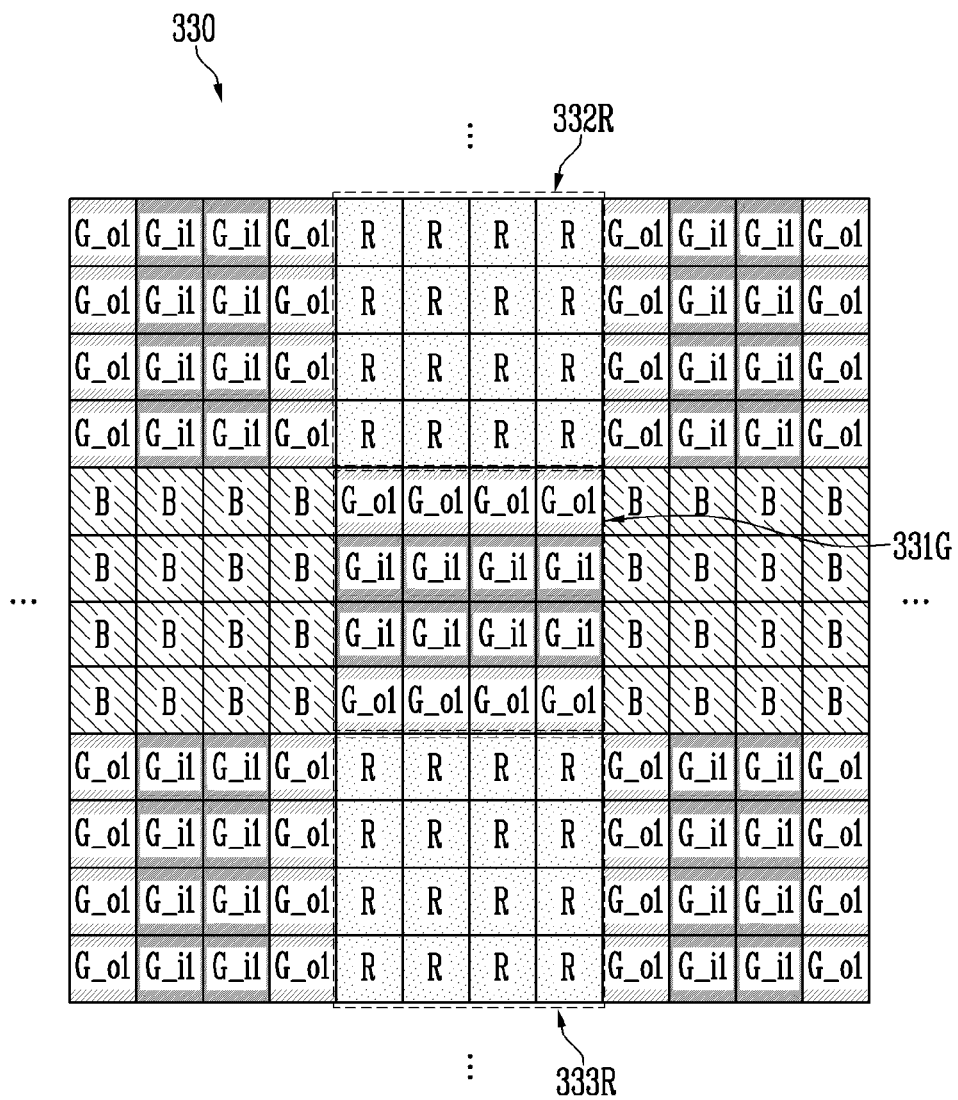
FIGS. 3B and 3C are diagrams illustrating crosstalk in accordance with an embodiment of the present disclosure.
Figure 3C:
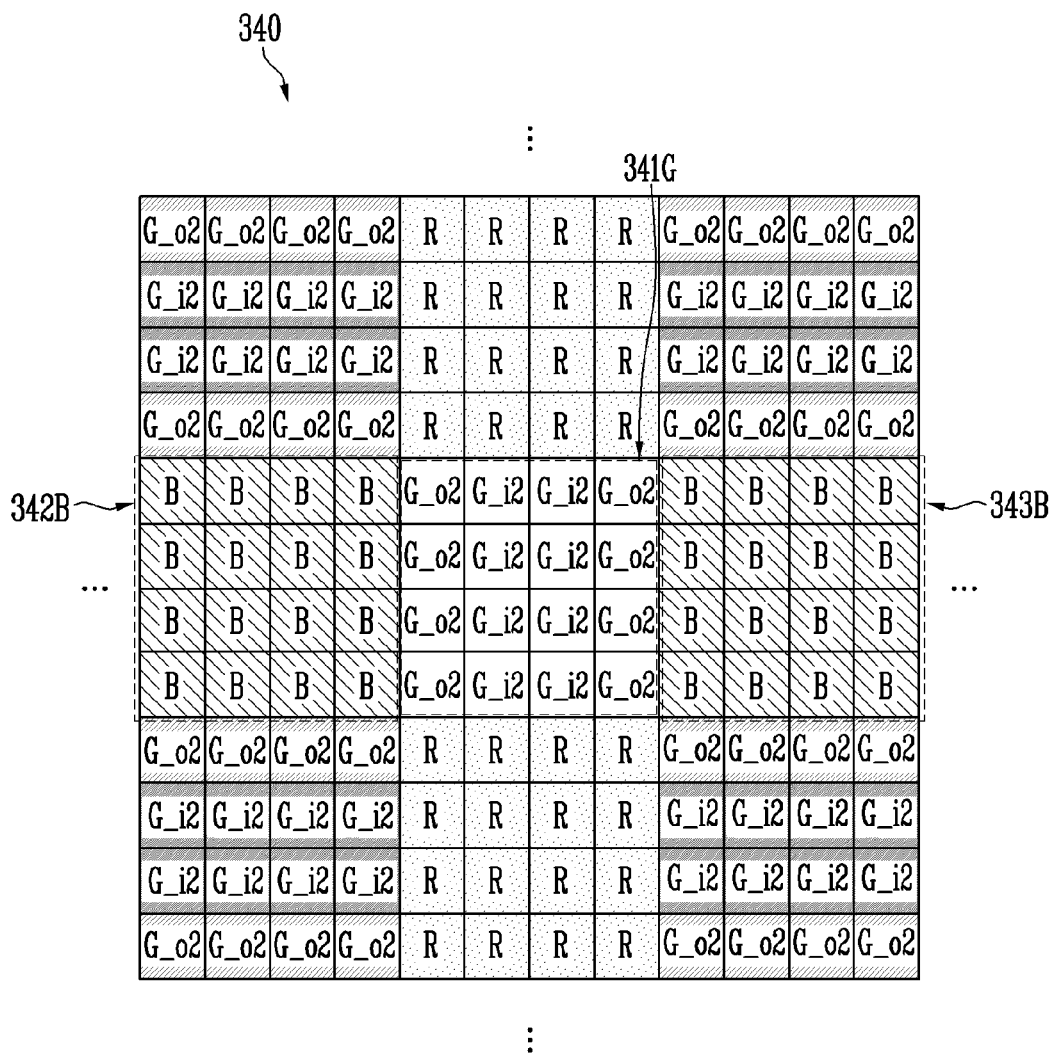

FIGS. 3B and 3C are diagrams illustrating crosstalk in accordance with an embodiment of the present disclosure.

Referring to FIG. 3B, a first image 330 represents an image acquired when a light source representing a red color is incident onto the image sensor having the quad square pattern.

The first image 330 may include a plurality of unit regions. The unit region is a region including pixel values representing the same color.

For example, the plurality of unit regions may include a first unit region 331G and second unit regions 332R and 333R, which are adjacent to each other. The second unit regions 332R and 333R may be regions located closest to the first unit region 331G in a column direction among row and column directions. The second unit regions 332R and 333R may include pixel values R having a color different from a color of pixel values G_o1 and G_i1 included in the first unit region 331G. A specific example will be described. The first unit region 331G may include green pixel values G_o1 and G_i1. For example, a first color may be green color, and the first unit region 331G may include green pixel values. The second unit regions 332R and 333R may include red pixel values R.

The green pixel values G_o1 and G_i1 may include outer pixel values G_o1 and inner pixel values G_i1. The outer pixel values G_o1 are pixel values located at the outside of the inner pixel values G_i1, and may be pixel values adjacent to pixel values of another color at the periphery thereof. In case of the first image 330 acquired as the light source representing the red color is incident, the outer pixel values G_o1 may be greater than the inner pixel values G_i1. This may occur due to crosstalk of the red pixel values R included in the second unit regions 332R and 333R at the periphery of the first unit region 331G. Such a result may occur when light transmitted through a color filter of a red pixel at the periphery of a green pixel reaches a sensing circuit of the green pixel.

Referring to FIG. 3C, a second image 340 represents an image acquired when a light source representing a blue color is incident onto the image sensor having the quad square pattern.

In the second image 340, green pixel values G_o2 and G_i2 included in a first unit region 341G may include outer pixel values G_o2 and inner pixel values G_i2. In the same manner as FIG. 3B, in the case of the second image 340 acquired as the light source representing the blue color is incident, the outer pixel values G_o2 may be greater than the inner pixel values G_i2. This may occur due to crosstalk of blue pixel values B included in third unit regions 342B and 343B at the periphery of the first unit region 341G.

In accordance with the present disclosure, outer pixel values or inner pixel values are corrected, thereby reducing crosstalk or grid noise of an image. Hereinafter, for convenience of description, a case where the crosstalk shown in FIG. 3B is corrected will be assumed and described.

Figure 4:
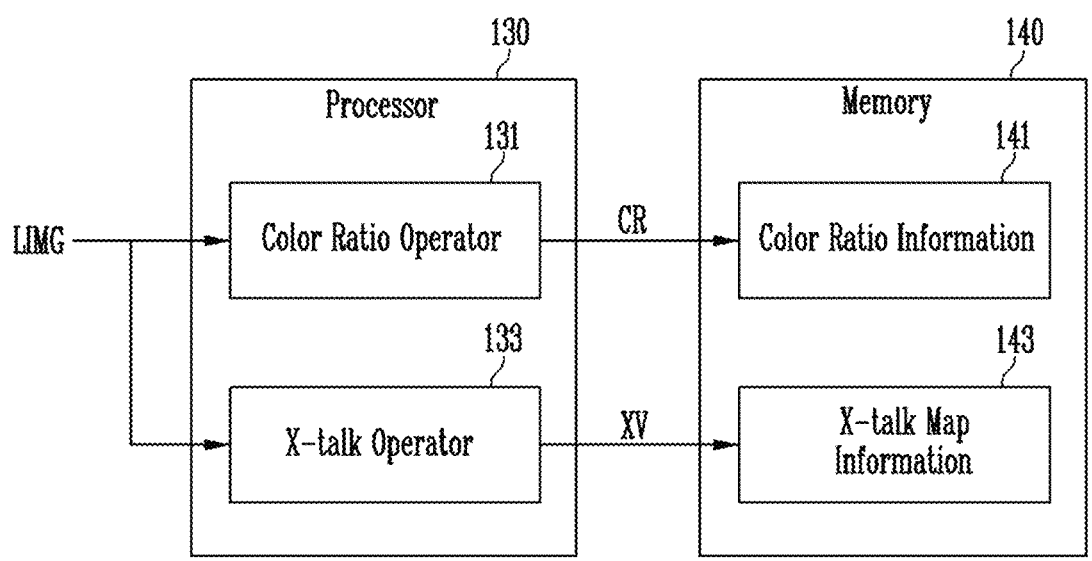
FIG. 4 is a diagram illustrating a processor and a memory of the image processing device in accordance with an embodiment of the present disclosure.

FIG. 4 is a diagram illustrating a processor and a memory of the image processing device in accordance with an embodiment of the present disclosure. Specifically, FIG. 4 illustrates an operation in which a processor processes a light source image in accordance with an embodiment of the present disclosure.

Referring to FIG. 4, the processor 130 may receive a light source image LIMG. The light source image LIMG may be an image acquired when a light source having a specific color (or wavelength) is incident onto the image sensor. The processor 130 may generate color ratio information 141 and crosstalk (X-talk) map information 143 on the light source image LIMG and store the color ratio information 141 and the crosstalk map information 143 in the memory 140.

The processor 130 may include a color ratio operator 131 and a crosstalk (X-talk) operator 133. Each of the color ratio operator 131 and the crosstalk operator 133 may be implemented as a hardware module such as a dedicated circuit or a software module representing an operation of the processor 130.

The color ratio operator 131 may acquire a reference color ratio CR of the light source image LIMG, when the light source image LIMG is received. The color ratio operator 131 may store the reference color ratio CR as the color ratio information 141 in the memory 140.

The crosstalk operator 133 may acquire a crosstalk value XV of the light source image LIMG, when the light source image LIMG is received. The crosstalk operator 133 may store the crosstalk value XV as the crosstalk map information 143 in the memory 140.

Figures 5A, 5B:
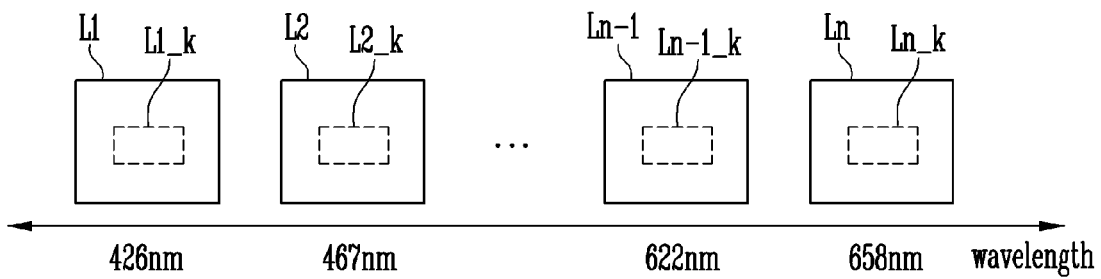
FIG. 5A is a diagram illustrating color ratio information in accordance with an embodiment of the present disclosure.
FIGS. 5B and 5C are diagrams illustrating a method of acquiring a reference color ratio in accordance with an embodiment of the present disclosure.

FIG. 5A is a diagram illustrating color ratio information in accordance with an embodiment of the present disclosure.

Referring to FIGS. 4 and 5A, the color ratio operator 131 may acquire a reference color ratio CR of each of a plurality of light source images L1 to Ln and store the acquire reference color ratio CR as color ratio information 141 and 510 in the memory 140. The color ratio information 141 and 510 generated through the above-described process may include a reference color ratio CR corresponding to each of the plurality of light source images L1 to Ln.

The plurality of light source images L1 to Ln may be images obtained by sensing light sources having different wavelengths. The reference color ratio CR may include a GR ratio value and a GB ratio value. The GR ratio value may be a ratio value of green pixel values and red pixel values, which are included in one light source image LIMG, and the GB ratio value may be a ratio value of green pixel values and blue pixel values, which are included in the one light source image.

Figure 5C:
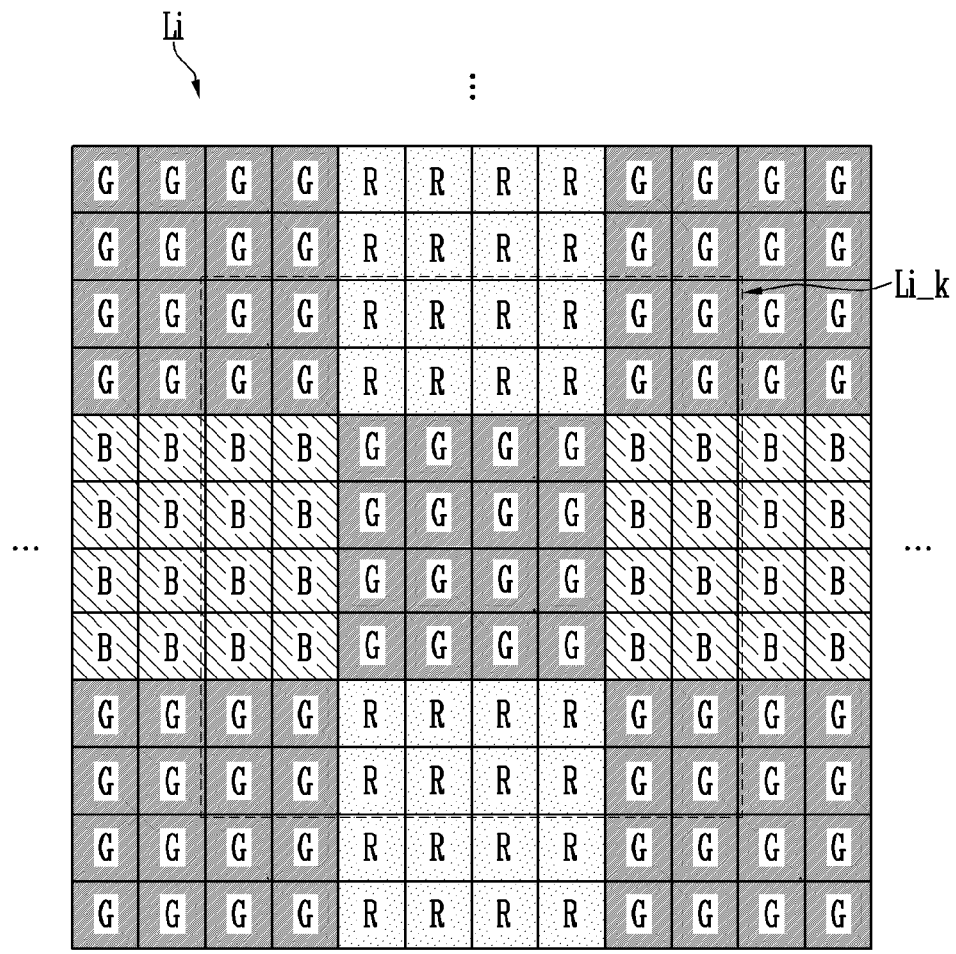

FIGS. 5B and 5C are diagrams illustrating a method of acquiring a reference color ratio in accordance with an embodiment of the present disclosure.

Referring to FIGS. 5B and 5C, the color ratio operator 131 may select reference regions L1_k to Ln_k in the light source images L1 to Ln. Each of the reference regions L1_k to Ln_k may be a partial region of each of the light source images L1 to Ln or be the entire region of each of the light source images L1 to Ln.

When each of the reference regions L1_k to Ln_k is a partial region of each of the light source images L1 to Ln, a position and a size of each of the reference regions L1_k to Ln_k may be predetermined. For example, each of the reference regions L1_k to Ln_k may be predetermined as a region having a size of 12×12 at a central position of each of the light source images L1 to Ln. However, this is merely an embodiment, and each of the reference regions L1_k to Ln_k may be variously modified and embodied.

Hereinafter, an ith light source image Li shown in FIG. 5C will be representatively described in detail.

Referring to FIG. 5C, the color ratio operator 131 may select a reference region Li_k in the ith light source image Li. For example, the reference region Li_k may be a region predetermined as a region having a size of 8×8 at a central position of the ith light source image Li. The reference region Li_k may be set to have a size including a green pixel value, a red pixel value, and a green pixel value.

In an embodiment, the color ratio operator 131 may acquire a first average value average_G of green pixel values and a second average value average_R of red pixel values among pixel values included in the reference region Li_k through a color ratio operation 520. The color ratio operator 131 may acquire a GR ratio value GR ratio as a ratio value of the first average value average_G and the second average value average_R. In this manner, the color ratio operator 131 may acquire a GB ratio value GB ratio as a ratio value of the first average value average_G of the green pixel values and a third average value average_B of blue pixel values among the pixel values included in the reference region Li_k.

The color ratio operator 131 may map a reference color ratio including the GR ratio value GR ratio and the GB ratio value GB ratio to the ith light source image Li, and store, in the memory 140, color ratio information including the ith light source image Li and the reference color ratio, which are mapped to each other.

FIG. 6A is a diagram illustrating crosstalk map information in accordance with an embodiment of the present disclosure.

Referring to FIGS. 4 and 6A, the crosstalk operator 132 may acquire crosstalk maps X1 to Xn of a plurality of light source images L1 to Ln and store, in the memory 140, the acquired crosstalk maps X1 to Xn as crosstalk map information 143 and 600.

The crosstalk map information 143 and 600 may include a plurality of crosstalk maps X1 to Xn. The crosstalk maps X1 to Xn may be respectively acquired from corresponding light source images L1 to Ln. The plurality of light source images L1 to Ln may be images obtained by sensing light sources having different wavelengths.

Each of the crosstalk maps X1 to Xn may include at least one of a GR crosstalk value and a GB crosstalk value. The GR crosstalk value may represent a degree to which crosstalk is generated in a green pixel (or green pixel value) by an adjacent red pixel (or red pixel value), and the GB crosstalk value may represent a degree to which crosstalk is generated in a green pixel (or green pixel value) by an adjacent blue pixel (or blue pixel value).

In an embodiment, the GR crosstalk value (or the GB crosstalk value) may be a difference between an outer pixel value and an inner pixel value, which are included in a unit region. Alternatively, the GR crosstalk value (or the GB crosstalk value) may be a ratio of an outer pixel value and an inner pixel value, which are included in a unit region. The unit region may be a region including pixel values representing the same color.

Figure 6B:
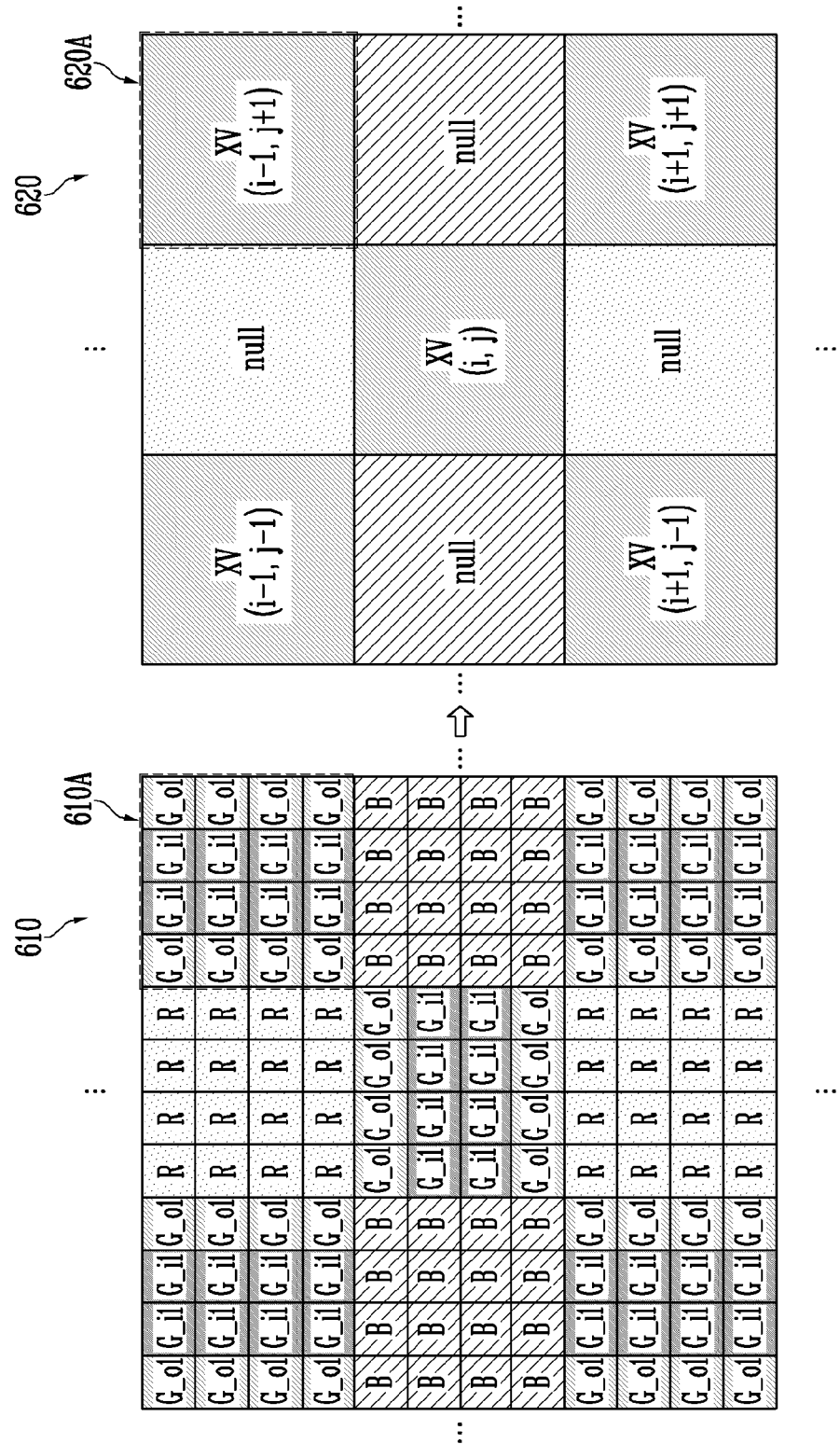
FIGS. 6B to 6D are diagrams illustrating a crosstalk value of a light source image in accordance with an embodiment of the present disclosure.
Figure 6C:
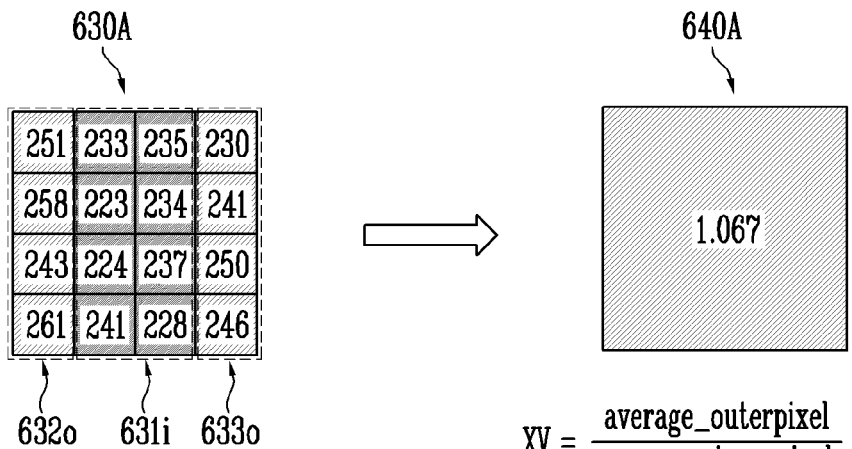
Figure 6D:
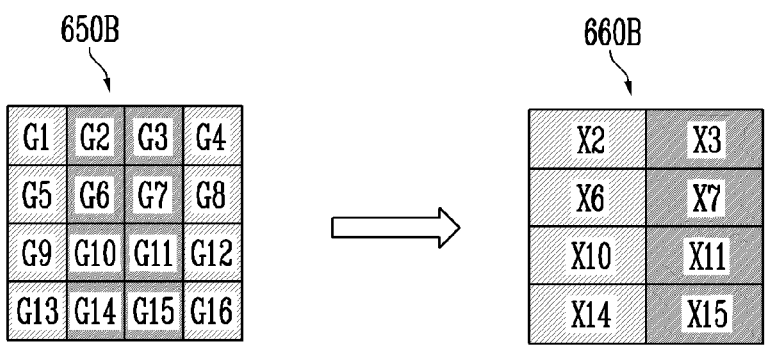

FIGS. 6B to 6D are diagrams illustrating a crosstalk value of a light source image in accordance with an embodiment of the present disclosure.

Referring to FIG. 6B, the crosstalk operator 133 may acquire a crosstalk map 620 corresponding to a light source image 610. FIG. 6B illustrates a case where the crosstalk map 620 is of a red type. The same manner may be applied even when the crosstalk map 620 is of a blue type.

Specifically, the crosstalk operator 133 may acquire a crosstalk value for each unit region of the light source image 610. For example, the crosstalk operator 133 may acquire a first crosstalk value 620A corresponding to a first unit region 610A, based on outer pixel values G_o1 and inner pixel values G_i1 of the first unit region 610A.

The light source image 610 may include a plurality of unit regions. The plurality of unit regions may include the first unit region 610A in which green pixel values G_o1 and G_i1 are arranged, a second unit region in which red pixel values R are arranged, and a third unit region in which blue pixel values B are arranged. Each of the second unit region and the third unit region may be a region adjacent to the first unit region 610A in a row or column direction. The green pixel values G_o1 and G_i1 of the first unit region 610A may include the outer pixel values G_o1 adjacent to the red pixel values R and the inner pixel values G_i1 between the outer pixel values G_o1.

A method of acquiring a crosstalk value will be described in detail with reference to FIGS. 6C and 6D.

Referring to FIG. 6C, the crosstalk operator 133 may acquire a first average value average_outerpixel of outer pixel values 632o and 633o included in a unit region 630A and a second average value average_innerpixel of inner pixel values 631i, and acquire a ratio value of the first average value average_outerpixel and the second average value average_innerpixel as a crosstalk value 640A corresponding to the unit region 630A. One crosstalk value 640A may be mapped to the unit region 630A to be stored.

Referring to FIG. 6D, the crosstalk operator 133 may acquire, as a crosstalk value XV, ratios X2, X3, X6, X7, X10, X11, X14, or X15 of an outer pixel value and an inner pixel value, which are adjacent to each other in one direction among row and column directions, among green pixel values G1 to G16 included in a unit region 650B. A plurality of crosstalk values XV arranged in 4×2 may be mapped to the unit region 650B to be stored.

For example, the crosstalk operator 133 may acquire, as a second crosstalk value X2, a ratio of a first outer pixel value G1 included in the unit region 650B and a second inner pixel value G2 adjacent to the first outer pixel value G1 in a row direction. In this manner, the crosstalk operator 133 may acquire crosstalk values XV by using the green pixel values G1 to G16 included in the unit pixel region 650B.

Figure 7:
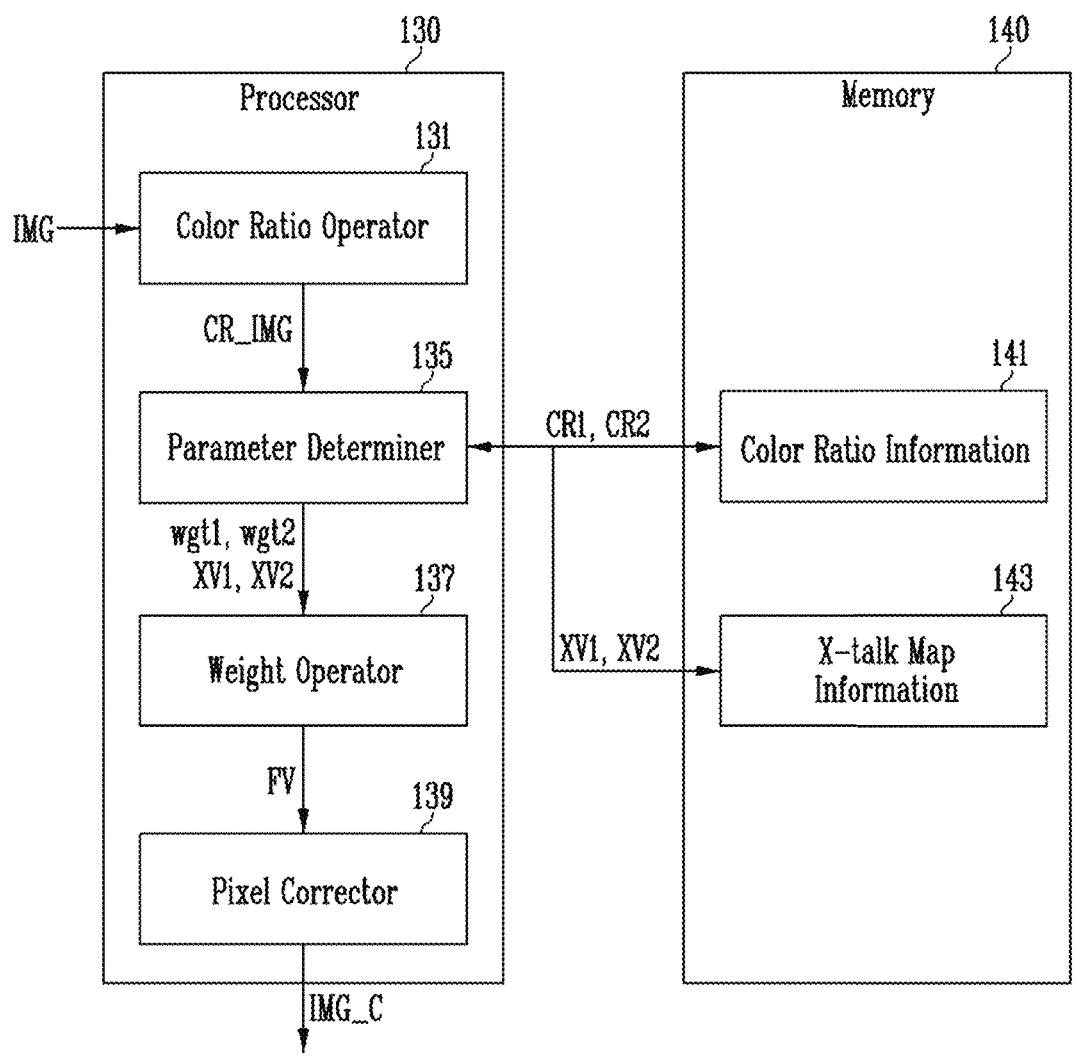
FIG. 7 is a diagram illustrating a processor and a memory of the image processing device in accordance with an embodiment of the present disclosure.

FIG. 7 is a diagram illustrating a processor and a memory of the image processing device in accordance with an embodiment of the present disclosure. Specifically, FIG. 7 illustrates an operation in which a processor corrects an image in accordance with an embodiment of the present disclosure.

Referring to FIG. 7, the processor 130 may receive an image IMG. The image IMG may include a plurality of unit regions. The unit region may include pixel values of the same color. In particular, a unit region including a green pixel value may include a pixel value divided into an outer pixel value and an inner pixel value. The processor 130 may correct an outer pixel value or an inner pixel value by using, as a weight, a reference color ratio of color ratio information 141 stored in the memory 140 and a crosstalk value of crosstalk map information 143 stored in the memory 140. As a result, the processor 130 generates a corrected image IMG_C.

The processor 130 may include at least one of a color ratio operator 131, a parameter determiner 135, a weight operator 137, and a pixel corrector 139. Each of the color ratio operator 131, the parameter determiner 135, the weight operator 137, and the pixel corrector 139 may be implemented as a hardware module such as a dedicated circuit or a software module representing an operation of the processor 130.

The color ratio operator 131 may select a reference region in the image IMG, when the image IMG is received. The color ratio operator 131 may acquire a color ratio CR_IMG by using pixel values of a first color and pixel values of a second color, which are included in the selected reference region. The color ratio CR_IMG may include a GR ratio value and a GB ratio value. The color ratio CR_IMG may be acquired in the same manner as the above-described reference color ratio CR, and therefore, overlapping descriptions will be omitted.

The color ratio operator 131 may acquire a first average value of green pixel values included in the selected reference region and a second average value of red pixel values included in peripheral regions of the selected reference region. The color ratio operator 131 may acquire, as the GR ratio value, a first ratio value of the first average value and a second average value. Also, the color ratio operator 131 may acquire the first average value of the green pixel values included in the selected reference region and a third average value of blue pixel values included in the peripheral regions of the selected reference region. The color ratio operator 131 may acquire, as the GB ratio value, a second ratio value of the first average value and the third average value.

Also, the color ratio operator 131 may determine a type corresponding to a lower value (or higher value) selected from the GR ratio value and the GB ratio value. For example, when the GR ratio value is a value lower than the GB ratio value, the color ratio operator 131 may determine the type as a first type (e.g., a GR type). When the GR ratio value is a value higher than the GB ratio value, the color ratio operator 131 may determine the type as a second type (e.g., a GB type).

The parameter determiner 135 may select first and second reference color ratios CR1 and CR2 among reference color ratios included in the color ratio information 141, based on the color ratio CR_IMG of the image IMG. For example, the parameter determiner 135 may compare first and second reference color ratios CR1 and CR2 having a type equal to a type of the color ratio CR_IMG with the color ratio CR_IMG. For example, when the type of the color ratio CR_IMG is the first type, a value of each of the color ratio CR_IMG and the reference color ratio, which are compared with each other, may be a GR ratio value. The parameter determiner 135 may compare the GR ratio value and the GR ratio value of the reference color ratio with each other, thereby selecting two reference color ratios CR1 and CR2 between which difference is smallest.

The parameter determiner 135 may acquire a first weight value wgt1 as a difference between the first reference color ratio CR1 and the color ratio CR_IMG, and acquire a second weight value wgt2 as a difference between the second reference color ratio CR2 and the color ratio CR_IMG.

The parameter determiner 135 may select a first reference crosstalk value XV1 and a second reference crosstalk value XV2 among crosstalk values included in the crosstalk map information 143. The first and second reference crosstalk values XV1 and XV2 may be acquired through the same light source image having the first and second reference color ratios CR1 and CR2.

The weight operator 137 may perform a weight operation of applying the first weight value wgt1 as a weight of the first reference crosstalk value XV1 and applying the second weight value wgt2 as a weight of the second reference crosstalk value XV2, thereby acquiring a final correction value FV as a result of the weight operation.

The pixel corrector 139 may correct inner pixel values included in the image IMG, using values obtained by multiplying the inner pixel values by the final correction value FV. Alternatively, the pixel corrector 139 may correct outer pixel values included in the image IMG, using values obtained by dividing the outer pixel values by the final correction value FV. The pixel corrector 139 may acquire a corrected image IMG_C in which the inner pixel values or the outer pixel values are corrected.

Figure 8:
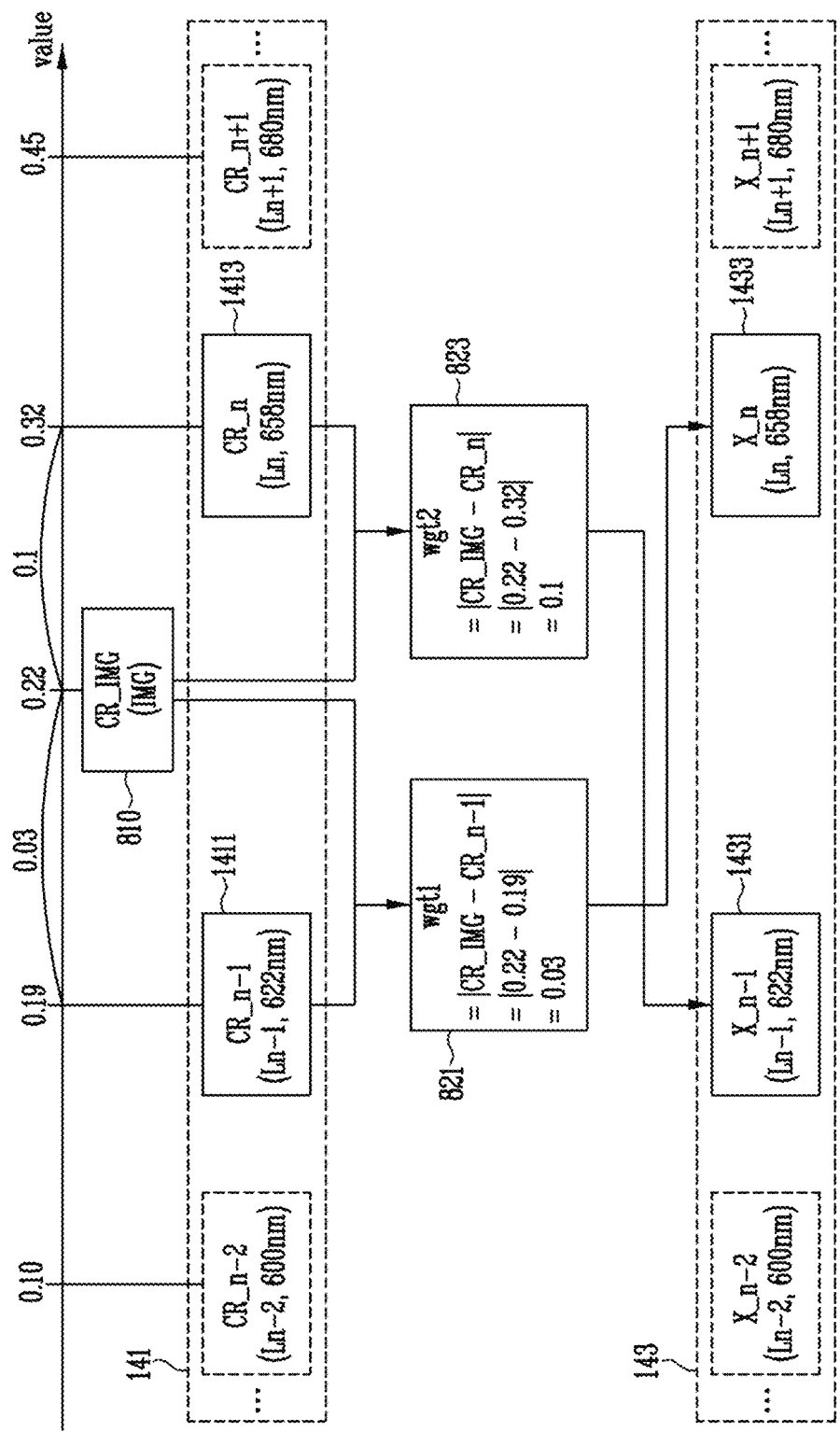
FIG. 8 is a diagram illustrating a weight value in accordance with an embodiment of the present disclosure.

FIG. 8 is a diagram illustrating a weight value in accordance with an embodiment of the present disclosure.

Referring to FIGS. 7 and 8, the parameter determiner 135 may select two reference color ratios 1411 and 1413 among reference color ratios included in the color ratio information 141, based on the color ratio CR_IMG of the image IMG. As described above, the color ratio information 141 may be pre-stored, and the color ratio CR_IMG may be acquired by the color ratio operator 131.

In a specific embodiment, the parameter determiner 135 may determine a smaller value selected from the GR ratio value and the GB ratio value, which are included in the color ratio CR_IMG, and determine a type corresponding to the smaller value. For example, when the GR ratio value is smaller than the GB ratio value, the type of the color ratio CR_IMG may be determined as a first type (e.g., a GR type). When the GB ratio value is smaller than the GR ratio value, the type of the color ratio CR_IMG may be determined as a second type (e.g., a GB type). The GR type represents that the image IMG has a relatively red color, and the GB type represents that the image IMG has a relatively blue color. Crosstalk of a red color may occur in the case of the GR type, and crosstalk of a blue color may occur in the case of the GB type. Therefore, correction for reducing crosstalk with respect to each type may be performed. Hereinafter, a case where the GR ratio value is 0.22 which is smaller than the GB ratio value, and the type of the color ratio CR_IMG is determined as the first type (e.g., the GR type) will be assumed and described.

The parameter determiner 135 may select two reference color ratios 1411 and 1413 having GR ratio values (e.g., 0.32 and 0.19) having smallest differences from the GR ratio value (e.g., 0.22) of the image IMG among reference color ratios CR_n−2 to CR_n+1 of the same type, which are included in the color ratio information 141. For example, when the type of the color ratio CR_IMG is the first type (e.g., GR type), the parameter determiner 135 may compare GR ratio values among GR ratio values and GB ratio values, which are included in the reference color ratio CR_n−2 to CR_n+1, with the GR ratio value of the image IMG, thereby selecting two reference color ratios 1411 and 1413 having GR ratio values of which differences from the GR ratio value of the image IMG are smallest.

The parameter determiner 135 may acquire two weight values 821 and 823, based on the color ratio CR_IMG of the image IMG and the two reference color ratios 1411 and 1413. Each of the weight values 821 and 823 may be a parameter by which a crosstalk value is multiplied in a weight operation. In an embodiment, the parameter determiner 135 may acquire two weight values 821 and 823 corresponding to the differences between the color ratio CR_IMG of the image IMG and the two reference color ratios 1141 and 1143. For example, the parameter determiner 135 may acquire a first weight value 821 as a difference value (e.g., 0.03) between the GR ratio value (e.g., 0.22) of the color ratio CR_IMG and a GR ratio value (e.g., 0.19) of an (n−1)th reference color ratio 1411, and acquire a second weight value 823 as a difference value (e.g., 0.1) between the GR ratio value (e.g., 0.22) of the color ratio CR_IMG and a GR ratio value (e.g., 0.32) of an nth reference color ratio 1413.

The parameter determiner 135 may acquire crosstalk values of two crosstalk maps 1431 and 1433 corresponding to the two reference color ratios 1411 and 1413 in the crosstalk map information 143. The (n−1)th reference color ratio 1411 and an (n−1)th crosstalk map 1431, which correspond to each other, may be acquired through an (n−1)th light source image Ln−1, and the nth reference color ratio 1413 and an nth crosstalk map 1433, which correspond to each other, may be acquired through an nth light source image Ln. The first weight value 821 may be a parameter by which a crosstalk value of the nth crosstalk map 1433 is multiplied in the weight operation, and the second weight value 823 may be a parameter by which a crosstalk value of the (n−1)th crosstalk map 1431 is multiplied in the weight operation. The crosstalk value may be a value at the same position as a pixel value to be corrected.

Figure 9:
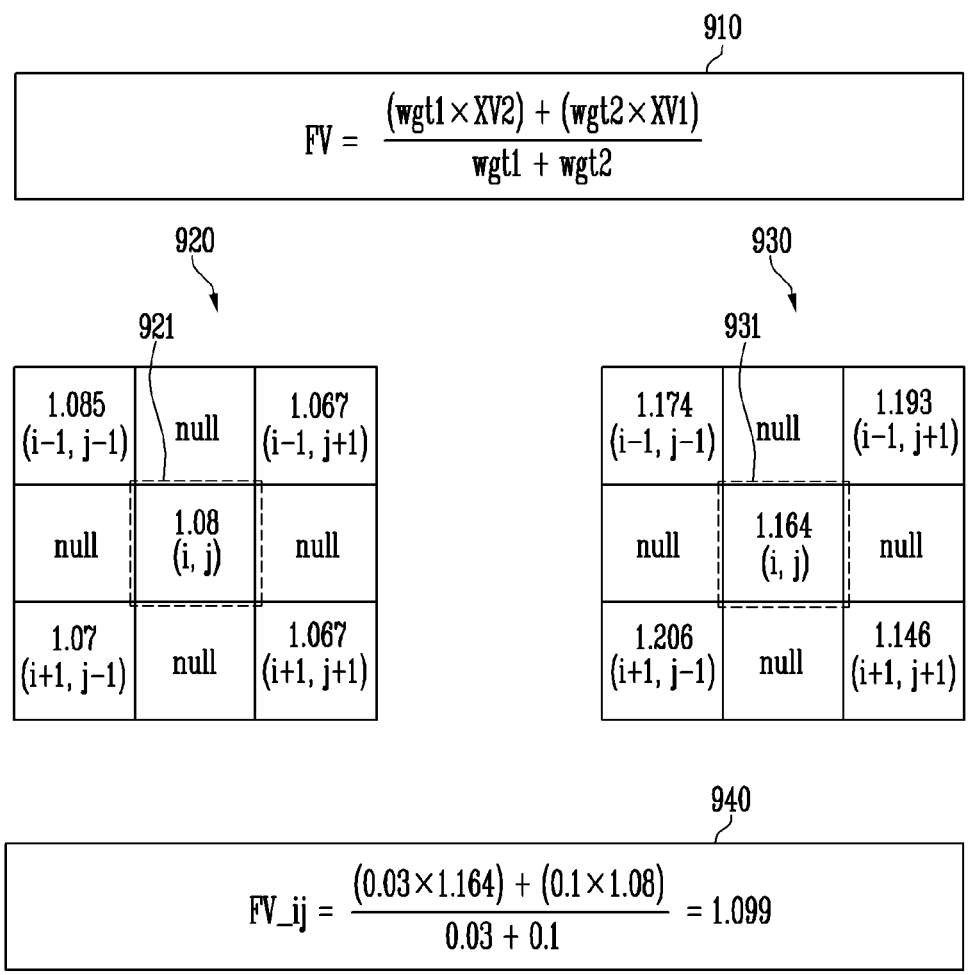
FIG. 9 is a diagram illustrating a final correction value in accordance with an embodiment of the present disclosure.

FIG. 9 is a diagram illustrating a final correction value in accordance with an embodiment of the present disclosure.

Referring to FIGS. 7 and 9, the weight operator 137 may acquire a final correction value FV through a weight operation 910 of applying a first weight value wgt1 as a weight of a second reference crosstalk value XV2 and applying a second weight value wgt2 as a weight of a first reference crosstalk value XV1. The first and second weight values wgt1 and wgt2 and the first and second reference crosstalk values XV1 and XV2 may be acquired by the above-described parameter determiner 135.

A case where a first crosstalk map 920 and a second crosstalk map 930 are selected among the plurality of crosstalk maps included in the crosstalk map information 143 will be assumed and described. The weight operator 137 may apply the second weight value wgt2 as a weight to a first reference crosstalk value 921 of a position (i, j) of a region to be corrected, in which a pixel value to be corrected is included, among crosstalk values included in the first crosstalk map 920. The weight operator 137 may apply the first weight value wgt1 as a weight to a second reference crosstalk value 931 of a position (i, j) of a region to be corrected, in which a pixel value to be corrected is included, among crosstalk values included in the second crosstalk map 930. The weight operator 137 may acquire a final correction value FV_ij as a result obtained by performing a weight operation 940.

For example, the weight operator 137 may acquire, as a numerator value, a sum of multiplication of 0.03 as the first weight value wgt1 and 1.164 as the second reference crosstalk value XV2 and multiplication of 0.1 as the second weight value wgt2 and 1.08 as the first reference cross talk value XV1 through the weight operation 940. The weight operator 137 may acquire, as a denominator value, a sum of 0.03 as the first weight value wgt1 and 0.1 as the second weight value wgt2. The weight operator 137 may acquire the final correction value FV_ij by dividing the numerator value by the denominator value. The final correction value FV_ij may be a value for correcting pixel values included in an (i, j) region as a region to be corrected in an image.

The first reference crosstalk value XV1 may be a crosstalk value corresponding to a selected region of an image among crosstalk values included in a crosstalk map of a first light source image. The second reference crosstalk value XV2 may be a crosstalk value corresponding to a selected region of an image among crosstalk values included in a crosstalk map of a second light source image.

Figure 10:
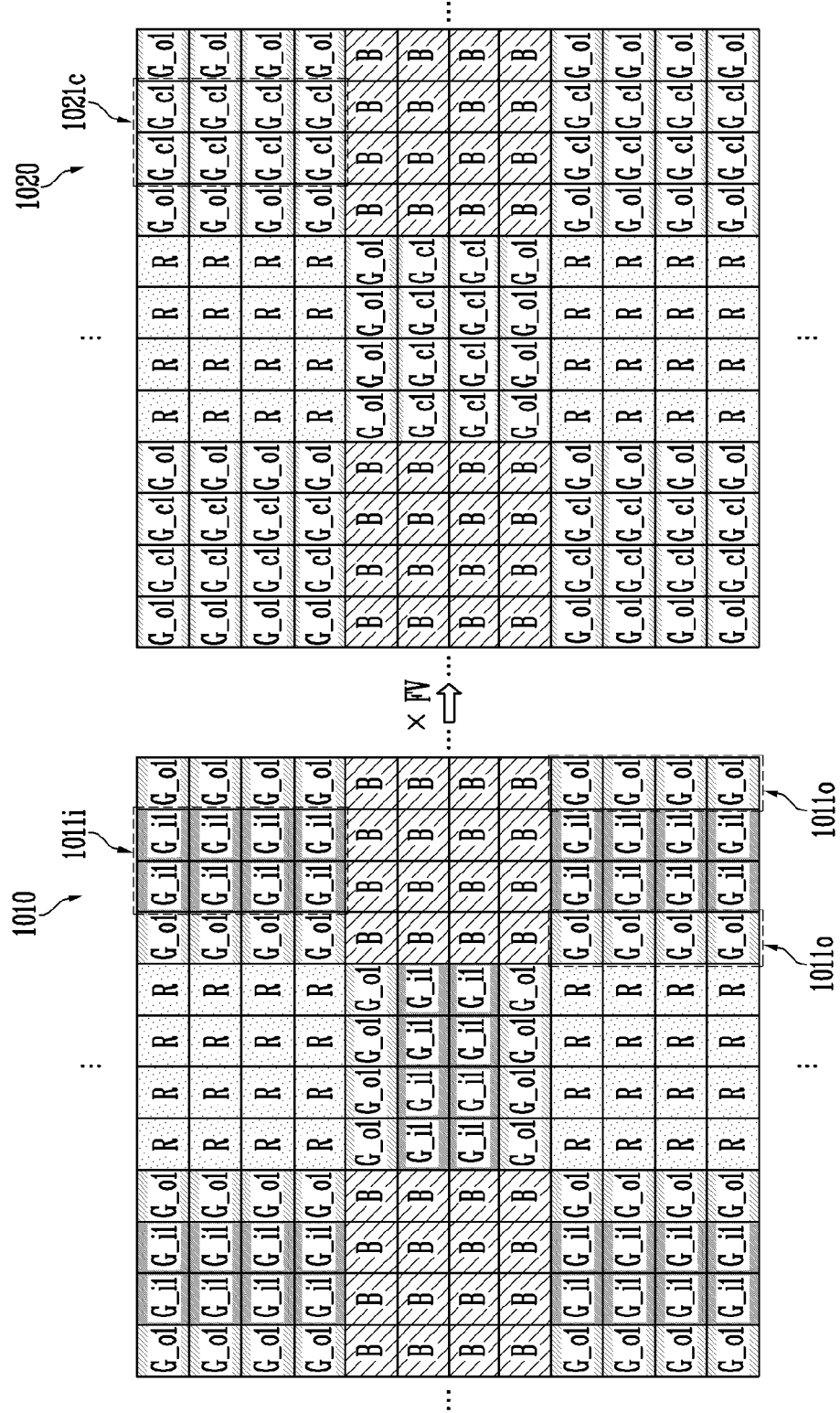
FIG. 10 is a diagram illustrating correction of a pixel value in accordance with an embodiment of the present disclosure.

FIG. 10 is a diagram illustrating correction of a pixel value in accordance with an embodiment of the present disclosure.

Referring to FIGS. 7 and 10, the pixel corrector 139 may correct inner pixel values G_i1 or outer pixel values G_o1 among green pixel values G_i1 and G_o1 included in an image 1010. The pixel corrector 139 may acquire a corrected image 1020 as a result obtained by correcting the image 1010.

In an embodiment, the pixel corrector 139 may correct inner pixel valued G_i1 included in an inner region 1011i by using a final correction value FV. The final correction value FV may be acquired by the above-described weight operator 137. For example, the pixel corrector 139 may acquire, as a corrected inner pixel value G_c1, a value obtained by multiplying the inner pixel value G_i1 by the final correction value FV. That is, the pixel corrector 139 may acquire the corrected image 1020 in which the inner pixel value G_i1 included in the image 1010 before the correction is replaced with the corrected inner pixel value G_c1.

In an embodiment, the pixel corrector 139 may correct outer pixel values G_o1 included in an outer region 1011o by using the final correction value FV. For example, the pixel corrector 139 may acquire, as a corrected outer pixel value, a value obtained by dividing the outer pixel value G_o1 by the final correction value FV. That is, the pixel corrector 139 may acquire a corrected image in which the outer pixel value G_o1 included in the image 1010 before the correction is replaced with the corrected outer pixel value.

FIG. 11 is a diagram illustrating an image processing method in accordance with an embodiment of the present disclosure.

Referring to FIG. 11, in the image processing method, light source images may be acquired by sensing light sources having different wavelengths (S1110). For example, a first light source image may be acquired by sensing a light source having a first wavelength, and a second light source image may be acquired by sensing a light source having a second wavelength.

In addition, reference color ratios and crosstalk values of each of the light source images may be stored (S1120). For example, color ratio information including a reference color ratio of a light source image may be stored in the image processing device 100. A plurality of crosstalk maps may be stored in the image processing device 100. Detailed contents of obtaining a reference color ratio overlap with those described above in FIGS. 5A to 5C, and therefore, their descriptions will be omitted. Detailed contents of obtaining a crosstalk value overlap with those described above in FIGS. 6A to 6D, and therefore, their descriptions will be omitted.

After that, an image including a plurality of regions each including pixel values of the same color may be acquired (S1130). In addition, a color ratio corresponding to a selected region among the plurality of regions may be acquired (S1140). One region including pixel values of a first color among the plurality of regions may be selected. The first color may be a green color. In addition, at least one peripheral region including pixel values of a second color among peripheral regions of the selected region may be selected. The second color may be one of a blue color and a red color. In an embodiment, a ratio value of an average value of the pixel values of the first color, which are included in the selected region, and an average value of the pixel values of the second color, which are included in the peripheral regions of the selected region, may be acquired as a color ratio.

In addition, selected crosstalk values (or reference crosstalk values) may be determined among the crosstalk values, based on a difference between the color ratio and each of the reference color ratios (S1150). In an embodiment, a first reference color ratio and a second reference color ratio, which have smallest differences from the color ratio and have signs opposite to each other, may be selected among the reference color ratios. For example, among the reference color ratios, the first reference color ratio having a smallest difference from a color ratio of an image while a difference between the color ratio of the image and the reference color ratio of the light source image is greater than 0 may be selected, and the second reference color ratio having a smallest difference from the color ratio of the image while a difference between the color ratio of the image and the reference color ratio of the light source image is smaller than 0 may be selected. The difference between the second reference color ratio and the color ratio may be acquired as a first weight value, and the difference between the first reference color ratio and the color ratio may be acquire as a second weight value.

In an embodiment, among the crosstalk values, a crosstalk value corresponding to the first reference color ratio and the selected region may be determined as a first reference crosstalk value, and the crosstalk value corresponding to the second reference color ratio and the selected region may be determined as a second reference crosstalk value. The first reference crosstalk value and the first reference color ratio may correspond to the same light source image, and the second reference crosstalk value and the second reference color ratio may correspond to the same light source image. For example, the first reference crosstalk value and the first reference color ratio may be values acquired from the first light source image obtained by sensing a light source having the same wavelength, and the second reference crosstalk value and the second reference color ratio may be values acquired from the second light source image obtained by sensing a light source having the same wavelength.

In addition, outer pixel values or inner pixel values, which are included in the selected region, may be corrected based on a weight operation of the selected crosstalk values (or reference crosstalk values) (S1160). Specifically, a final correction value may be acquired through a weight operation of the reference crosstalk values. In addition, outer pixel values or inner pixel values, which are adjacent to the pixel values of the second color, among the pixel values of the first color, which are included in the selected region, may be corrected, using the final correction value.

In an embodiment, the final correction value may be acquired through a weight operation of applying the first weight value as a weight of the first reference crosstalk value and applying the second weight value as a weight of the second reference crosstalk value. The first weight value and the second reference crosstalk value may be values acquired using the first light source image, and the second weight value and the first reference crosstalk value may be values acquired using the second light source image.

In an embodiment, the inner pixel values may be corrected using values obtained by multiplying the inner pixel values by the final correction value. Alternatively, the outer pixel values may be corrected using values obtained by multiplying the outer pixel values by the final correction value.

In accordance with the present disclosure, there can be provided an image processing device and an image processing method, which can reduce crosstalk of an image. Accordingly, grid noise can be reduced by compensating for a difference between pixel values of a specific color.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or some of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to explain embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. An image processing device comprising:
    a memory configured to store reference color ratios and crosstalk values of each of light source images acquired by sensing light sources having different wavelengths; and
    a processor configured to receive an image including a plurality of regions each including outer pixel values and inner pixel values of the same color, and correct the outer pixel values or the inner pixel values by using differences between the respective reference color ratios and a color ratio of the image as weights of the crosstalk values, wherein the processor includes a color ratio operator configured to acquire, as the color ratio, a ratio value of an average value of pixel values of a first color, which are included in a selected region among the plurality of regions and an average value of pixel values of a second color, which are included in a peripheral region of the selected region.

2. The image processing device of claim 1, wherein the first color is green, and the second color is red or blue.

3. The image processing device of claim 1, wherein the reference color ratios include three or more reference color ratios, and
wherein the processor includes a parameter determiner configured to:
select a first reference color ratio and a second reference color ratio, which have smallest differences from the color ratio and have signs opposite to each other, among the reference color ratios;
acquire the difference between the second reference color ratio and the color ratio as a first weight value; and acquire the difference between the first reference color ratio and the color ratio as a second weight value.

4. The image processing device of claim 3, wherein the processor includes a weight operator configured to:
determine a crosstalk value corresponding to the first reference color ratio and the selected region among the crosstalk values as a first reference crosstalk value included in the reference crosstalk values;
determine a crosstalk value corresponding to the second reference color ratio and the selected region among the crosstalk values as a second reference crosstalk value included in the reference crosstalk values; and
acquire a final correction value through a weight operation of applying the first weight value as a weight of the first reference crosstalk value and applying the second weight value as a weight of the second reference crosstalk value.

5. The image processing device of claim 4, wherein the processor includes a pixel corrector configured to correct the inner pixel values, using values obtained by multiplying the respective inner pixel values by the final correction value, or correct the outer pixel values, using values obtained by dividing the respective outer pixel values by the final correction value.

6. The image processing device of claim 1, wherein each of the light source images includes a plurality of pixel regions respectively corresponding to the plurality of regions of the image, and
wherein each of the crosstalk values is a value obtained using outer pixel values and inner pixel values, which are adjacent to pixel values of a second color, among pixel values of a first color, which are included in each of the plurality of pixel regions.

7. The image processing device of claim 1, wherein each of the reference color ratios is a value acquired using an average value of pixel values of a first color, included in a first pixel region among a plurality of pixel regions included in each of the light source images, and an average value of pixel values of a second color, which are included in peripheral pixel regions of the first pixel region.

8. The image processing device of claim 1, further comprising an image sensor including pixels of the same color, which are arranged in each unit region according to a quad square pattern or a triple square pattern,
wherein the processor acquires the image through the image sensor.

9. The image processing device of claim 1, further comprising a communication interface configured to receive the image from an external device.

10. An image processing method comprising:
acquiring light source images by sensing light sources having different wavelengths;
storing reference color ratios and crosstalk values of each of the light source images;
acquiring an image including a plurality of regions each including pixel values of the same color;
acquiring a color ratio corresponding to a selected region among the plurality of regions;
determining reference crosstalk values among the crosstalk values, based on a difference between the color ratio and each of the reference color ratios; and
correcting outer pixel values or inner pixel values, which are included in the selected region, through a weight operation of the reference crosstalk values,
wherein, in the acquiring of the color ratio, a ratio value of an average value of pixel values of a first color, which are included in the selected region among the plurality of regions and an average value of pixel values of a second color, which are included in a peripheral region of the selected region, is acquired as the color ratio.

11. The image processing method of claim 10, further comprising:
selecting a first reference color ratio and a second reference color ratio, which have smallest differences from the color ratio and have signs opposite to each other, among the reference color ratios; and
acquiring the difference between the second reference color ratio and the color ratio as a first weight value, and acquiring the difference between the first reference color ratio and the color ratio as a second weight value.

12. The image processing method of claim 11, wherein the determining the reference crosstalk values includes:
determining, as a first reference crosstalk value included in the reference crosstalk values, a crosstalk value corresponding to the first reference color ratio and the selected region among the crosstalk values; and
determining, as a second reference crosstalk value included in the reference crosstalk values, a crosstalk value corresponding to the second reference color ratio and the selected region among the crosstalk values.

13. The image processing method of claim 12, wherein the correcting the outer pixel values or the inner pixel values further includes:
acquiring a final correction value through the weight operation of applying the first weight value as a weight of the first reference crosstalk value and applying the second weight value as a weight of the second reference crosstalk value; and
correcting the inner pixel values, using values obtained by multiplying the respective inner pixel values by the final correction value, or correcting the outer pixel values, using values obtained by dividing the respective outer pixel values by the final correction value.

14. The image processing method of claim 10, wherein the storing the reference color ratios and the crosstalk values includes:
acquiring a first light source image by sensing a light source having a first wavelength among the light source images; and
storing, as a first reference color ratio, a ratio value of an average value of pixel values of the first color, which are included in a pixel region corresponding to the selected region among a plurality of pixel region included in the first light source image, and an average value of pixel values of the second color, which are included in peripheral regions of the pixel region.

15. The image processing method of claim 14, wherein storing the reference color ratios and the crosstalk values further includes:
   selecting a first pixel region including the pixel values of the first color among the plurality of pixel regions included in the first light source image; and
   storing, as a first crosstalk value for the first pixel region, a ratio value of an average value of outer pixel values and an average value of inner pixel values, which are adjacent to the pixel values of the second color, among the pixel values of the first color, which are included in the first pixel region.

16. The image processing method of claim 10, wherein the acquiring the image includes receiving the image from an external device of an image processing device.

17. The image processing method of claim 10, wherein the acquiring the image includes receiving the image from an image sensor of an image processing device.

* * * * *